United States Patent [19]
Scarpino

[11] 3,913,010

[45] Oct. 14, 1975

[54] MEANS AND METHOD FOR MEASURING ELECTRICAL-GROUND RESISTANCE BETWEEN EARTH-SEPARATED LOCATIONS

[75] Inventor: Leopoldo Scarpino, Evansville, Ind.

[73] Assignee: AMAX Inc., New York, N.Y.

[22] Filed: Apr. 30, 1974

[21] Appl. No.: 465,591

Related U.S. Application Data

[63] Continuation-in-part of Ser. No. 379,243, July 16, 1973, which is a continuation-in-part of Ser. No. 358,468, May 9, 1973.

[52] U.S. Cl. ..................................... 324/51; 324/62
[51] Int. Cl.² ................. G01R 31/02; G01R 27/20
[58] Field of Search ........ 324/51, 52, 62; 317/18 R, 317/18 B; 340/255

[56] References Cited
UNITED STATES PATENTS

| | | | |
|---|---|---|---|
| 1,034,609 | 8/1912 | Friendly | 324/52 |
| 3,234,459 | 2/1966 | Brazee | 324/52 |
| 3,365,661 | 1/1968 | Zimmerman | 324/52 |
| 3,706,927 | 12/1972 | Jedvall | 324/52 |

FOREIGN PATENTS OR APPLICATIONS

| | | | |
|---|---|---|---|
| 411,673 | 5/1945 | Italy | 324/52 |

*Primary Examiner*—Gerard R. Strecker
*Attorney, Agent, or Firm*—Hopgood, Calimafde, Kalil, Blaustein and Lieberman

[57] ABSTRACT

The invention contemplates safety monitoring by measuring the electrical-resistance condition of a remote electrical ground with reference to a given base end, as in application to elongate flexible trailing cable of the character used to supply large quantities of electrical power from a base or source-connection end to a movable load-connection end, which may be as much as several miles remote from the base end. The measurement involves a relatively simple set of electrical components whereby a Wheatstone bridge may be defined using the unknown earth resistance as one arm of the bridge; two flexible conductors connect the set (at the base end) to the remote ground.

10 Claims, 8 Drawing Figures

MEANS AND METHOD FOR MEASURING ELECTRICAL-GROUND RESISTANCE BETWEEN EARTH-SEPARATED LOCATIONS

The present application is a continuation-in-part of my copending application Ser. No. 379,243, filed July 16, 1973, which in turn is a continuation-in-part of my copending application Ser. No. 358,468, filed May 9, 1973.

This invention relates to means and a technique for measuring electrical resistance of the earth between two spaced grounding connections to earth. The invention has various applications, including use with trailing cables or the like wherein there must be assurance that remote apparatus cannot develop lethal electrical ground potentials with respect to earth potential.

In the supply of electrical power to heavy and distant moving industrial machines such as strip-mining shovels, a single multiple-conductor trailing cable provides flexible connection of the remote machine to its base or source-connection end. Very often a major source connection will supply a plurality of trailing cables, serving different-size loads at a variety of remote and moving destinations, and using a variety of power-conductor voltages as appropriate for each load and its distance from the base; in other situations, extension, tapping or branch trailing-cable connections of various capacities are made to a single major trailing cable, at locations along the length of the major cable, and with extension or branch-cable capacities and lengths appropriate to the several different loads served thereby. In general, it can be said that whatever the capacity of a major or branch cable, it has (a) its own source-connection end at which circuit breakers serve exclusively to protect electric power supplied to the particular cable (neutral-to-ground resistance being selected for an ohmic value which will limit current flow due to a power fault to ground so as not to exceed 25 amperes), (b) a load-connection end, which may be a traveling machine, or a step-down transformer for supply of one of more further branch cables, (c) a ground conductor which is relied upon to maintain a prescribed degree of electric integrity of all cable and load grounds with respect to ground potential at the source-connection end, and (d) a pilot conductor which is relied upon to maintain current in a fail-safe circuit through the associated ground conductor, so that the applicable circuit breakers will trip in the event of current failure in the fail-safe circuit, (e) the power conductors, ground conductor and pilot conductor all forming mutually insulated elements of the particular trailing cable. As used in this specification, the expression "trailing cable" will be understood to apply to a given length, served from a source-connection end, and serving a load-connection end, via multiple-conductor flexible cable, such as that just described, regardless of whether the particular length is a major cable (e.g., three-phase power distribution at 15 kilovolts) or a branch cable (e.g., at 6900 or 440 volts).

The schemes which have to date been devised to assure against development of excessive ground potentials (to earth) in trailing-cable systems of the character indicated are many and are in general not practical. For example, a "series-connected" variety uses a d-c source at the source-connection end of the pilot-line arm of the fail-safe circuit, the latter being completed by connection of the ends of said arm to the corresponding ends of the ground conductor. In such a system, the fail-safe relay at the source-connection end of the pilot line is set to drop out (i.e., to trip the associated breakers) at a preselected minimum level of fail-safe current, on the assumption that such level is indicative of excessive resistance in the ground conductor; the difficulty with such a system is that it does not and cannot assuredly operate on the resistance of the ground wire, due to its vulnerability to resistance-reducing effects of shunt paths. Also, a "shunt-connected" variety places the coil of the fail-safe relay in shunt across the d-c source and a suitable resistor, to monitor for current build-up beyond a predetermined level, as in the case of a breakage in the ground conductor. Neither of these kinds of solution is adequate to the task of always tripping the breakers should the ground wire itself increase in resistance above a predetermined level, short of the minimum earth resistance between the source-connection and load-connection ends of the cable.

It is, accordingly, an object of the invention to provide an improved safety mechanism of the character indicated.

Another object is to provide such an improved mechanism without requiring any change in cable construction.

A specific object is to provide such an improved mechanism which is sensitive essentially only to ground-conductor resistance, and at a predetermined level less than the minimum local earth resistance and greater than the "good-condition" or "equal-to-new" resistance of the ground conductor.

Another specific object is to provide such an improved mechanism which will assuredly operate to trip the associated breakers when detected ground-conductor resistance is at least no greater than 4 ohms.

A further specific object is to provide such a system wherein that resistance value can be selected, upon the detection of which value as the resistance of the ground conductor, the associated breakers will automatically shut down the supply of power to the trailing cable.

Another specific object is to provide simple electrical components enabling a ground connection at a first location and flexible cable connection to a remotely located ground connection, whereby the earth resistance between said locations is essentially the only electrical quantity presented to a resistance-measuring set which is otherwise fully contained in the set.

A general object is to achieve the foregoing objects with basically simple and reliable circuitry, requiring little or no adjustment, monitoring or maintenance; mechanism that is relatively fool-proof and involves the use of available, non-critical components, and which at the same time lends itself to the measurement of the lowest earth-resistance magnitudes over distances ranging up to a matter of miles.

Other objects and various further features of novelty and invention will be pointed out or will occur to those skilled in the art from a reading of the following specification, in conjunction with the accompanying drawings. In said drawings, which show illustrative preferred forms of the invention:

Figure 1:
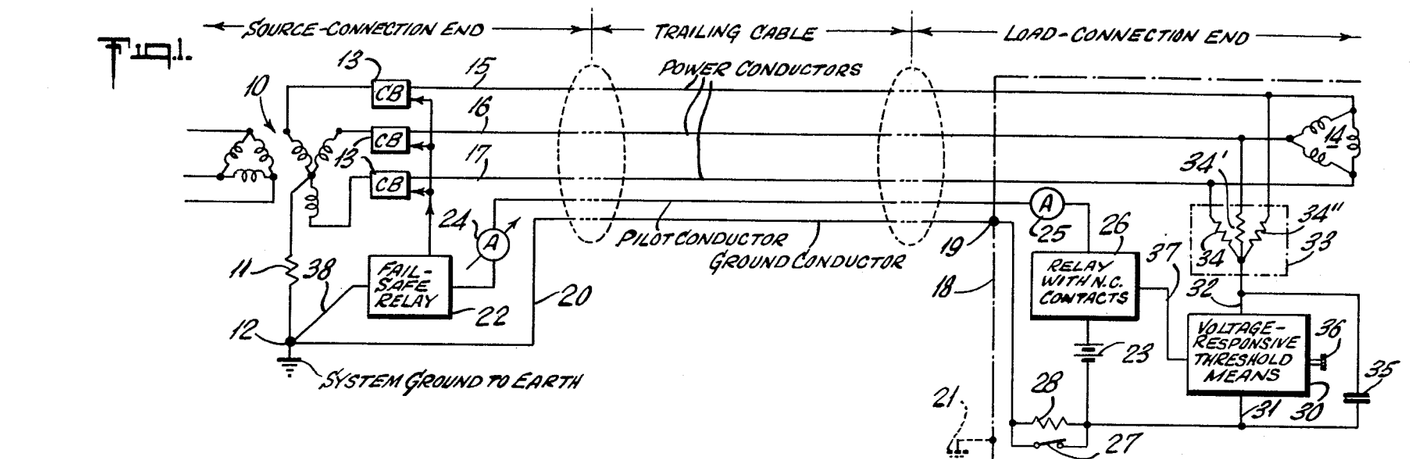
FIG. 1 is a diagram schematically showing one embodiment of the invention, in application to a trailing cable and its power-supply and load connections.

The system of FIG. 1 is seen to employ a five-conductor trailing cable which will be understood to extend flexibly between a source-connection end and a load-connection end, all as generally indicated by leg-end in the drawing. The system is illustrative of the principle of resistance-monitoring in the ground conductor, utilizing constant current in a series-connected fail-safe circuit which includes the ground conductor, and observing voltage drop between ends of the ground conductor.

Specifically, the ground-connection end is shown to include a three-phase power-source connection comprising a transformer 10 having Δ-connected primary windings and Y-connected secondary windings, the secondary "neutral" or "center" having a grounding resistance 11 in its connection to the point 12 of system-grounding to earth. Three-phase power is supplied through line circuit breakers 13 to a delta-connected load 14, via three power conductors 15–16–17. The trailing-cable length between the source-connection and load-connection ends will be understood to be flexible, adapted to lie on the surface of the terrain, and to extend various distances, for example up to five or more miles, the conductor size and transmission voltage being as appropriate for the load and distance requirements imposed on the cable shown. The load-connection end will be understood to comprise a metal housing or machine frame 18, indicated by dashed outline and having a terminal 19 by which the ground conductor 20 of the cable is directly clamped to the system-ground terminal 12; the indeterminate relation of the load-frame ground to local-earth ground is suggested by dashed-line symbolism at 21. The circuit of a series-connected fail-safe relay 22 is shown to include ground conductor 20 and a pilot-arm. The pilot arm is connected to ground conductor 20 at the system-ground terminal 12 and additionally includes the coil of relay 22, a d-c source 23, means 24 for the regulation of d-c current to a predetermined level (as suggested by an arrow symbol), a local ammeter 25, a relay 26 with normally closed contacts which are openable to interrupt current flow in the fail-safe circuit, and local test elements comprising normally closed contacts 27 bridging a test resistor 28. The completed circuit through the thus-far described parts bears a functional resemblance to series-connected systems of the prior art.

In accordance with the invention, means are provided at one or both of the connection ends of the trailing cable whereby ground-conductor resistance is monitored by a direct measurement between the ground-connection terminals, i.e., with substantially the same effectiveness as if one could take a familiar volt-ohm meter and apply its respective leads to terminals 12–19, in spite of the great physical distance between these terminals.

In the form of FIG. 1, wherein the regulating means 24 (which may be a variable resistor of ohmic value substantially exceeding the ohmic resistance of the ground wire) serves to maintain substantially constant current in the fail-safe circuit; therefore, voltage measured between terminals 12–19 is directly indicative of ground-conductor resistance. Such a voltage-responsive means is schematically indicated at 30, at the load-connection end; as shown, one of the voltage-sensing "leads" 31 of means 30 is connected to the machine frame, i.e., terminal 19, and the other lead 32 makes use of the d-c capabilities of neutral-connections to the respective ends of the power conductors 15-1-6-17, without in any way impairing or being adversely affected by the relatively great quantities of three-phase power being delivered to and consumed by load 14. If the load 14 were Y-connected, direct connection of the voltage-sensing lead 32 could be made thereto, preferably through a suitably large protective grounding resistor; but in view of the delta-connection of load 14, I employ a network 33 of like resistors 34–34'–34" connected to the respective power conductors, and establishing a local "neutral" at their common connection to lead 32. Also, preferably a by-pass capacitor 35 bridges the voltage-responsive means 30, to assure a-c elimination from the desired d-c voltage response. Thus, whether the load is delta or Y-connected, lead 32 has a local d-c or "neutral" connection to the power conductors, and all three power conductors 15–16–17 provide the means of effectively extending lead 32 to the system-ground terminal 12.

Voltage-responsive means 30 will be understood to be of the very high impedance variety, such as a vacuum-tube voltmeter, so that it does not rely upon drawing d-c or other current via the lengthy lead connection to terminal 12. Also, as a straight voltmeter, the means 30 will be further understood, with a scale calibrated in ohms, to be directly and correctly readable in terms of true resistance between terminals 12–19.

Still further symbolism appears in the drawing, to illustrate automatic functioning of the described circuit. The voltage-responsive means 30 is indicated by legend to include a threshold-operating feature, whereby upon response to a detected d-c voltage of magnitude predetermined as by manual selection and adjustment at a knob 36, an output signal is produced in a control connection 37 to the coil of relay 26, such output signal being operative to open the normally closed contacts of relay 26 and thus to interrupt the normal flow of current in the fail-safe circuit. Such interruption will be recognized at relay 22, since its picked-up condition can no longer be maintained, and all circuit breakers will trip, to de-energize the power conductors and the load.

The drawing also shows, at 27–28 means for testing the operability of the automatic circuitry which has been described. Normally, the closed contacts 27 will enable the voltage-responsive means 30 to make a true resistance measurement of ground conductor 20. However, to make sure that the automatic circuitry is correctly operative, a push button need only be pressed to open contacts 27, thus causing means 30 to additionally sense the voltage drop across resistor 28, it being understood that resistor 28 is selected of such magnitude, for the constant current regulated at 24, to assure appearance of an seemingly "dangerous" ground-conductor resistance, e.g., 4 ohms or more. In the circumstances, means 30 has no choice but to produce the relay-operating output in line 37, whereby breakers 13 are caused to trip as part of a test procedure. It will also be understood that the test elements 27–28 can be anywhere in series with the ground conductor and in the fail-safe circuit, as for example at the source-connection end of the system, as long as the test elements 27–28 are embraced by the voltage response of means 30.

In normal operation, d-c current flows continuously in the fail-safe circuit comprising the pilot and ground conductors, and the closed contacts at 26–27, thus maintaining a hold-in supply of current to the coil of fail-safe relay 22, so that breakers 13 continuously enable full power to pass to the load 14. In such normal operation, the d-c current remains substantially constant, so that voltage drop between terminals 12–19 is a true indication of ground-conductor resistance, under the constant surveilance of the voltage-responsive threshold means 30. Periodically, operation can be checked out by opening the test contacts 27, causing threshold detection at 30, with resultant opening of relay contacts at 26, drop-out of the fail-safe relay, and tripping of breakers 13. The same result will also ensue if means 30 should detect the threshold without operation of test contacts 27, meaning of course that the detected increase in ground conductor resistance is a true cause for automatic alarm, here noted by trip of the breakers 13.

Stated in more practical illustrative terms, for grounding resistor 11 selected to limit a ground-to-power conductor fault to 25 amperes, and for a 0.5-ampere fail-safe current selected at 24, and for means 36 set to trip at 2 volts (meaning a limiting ground-conductor resistance of 4 ohms), no short circuit, as from a power conductor to the ground conductor, can ever develop a ground-conductor voltage greater than 100 volts (25 amperes, times 4 ohms); thus the greatest personnel exposure to ground-conductor voltage will be held to a short transient of no more than 100 volts. It will be understood that, with changed settings, the described system has the inherent capacity to protect as to an even lower limiting condition, the presently illustrative values being supplied merely because they realize the currently stated Bureau of Mines safety objective, which to my knowledge has not hitherto been reliably realized by any other ground-protection system.

Figure 2:
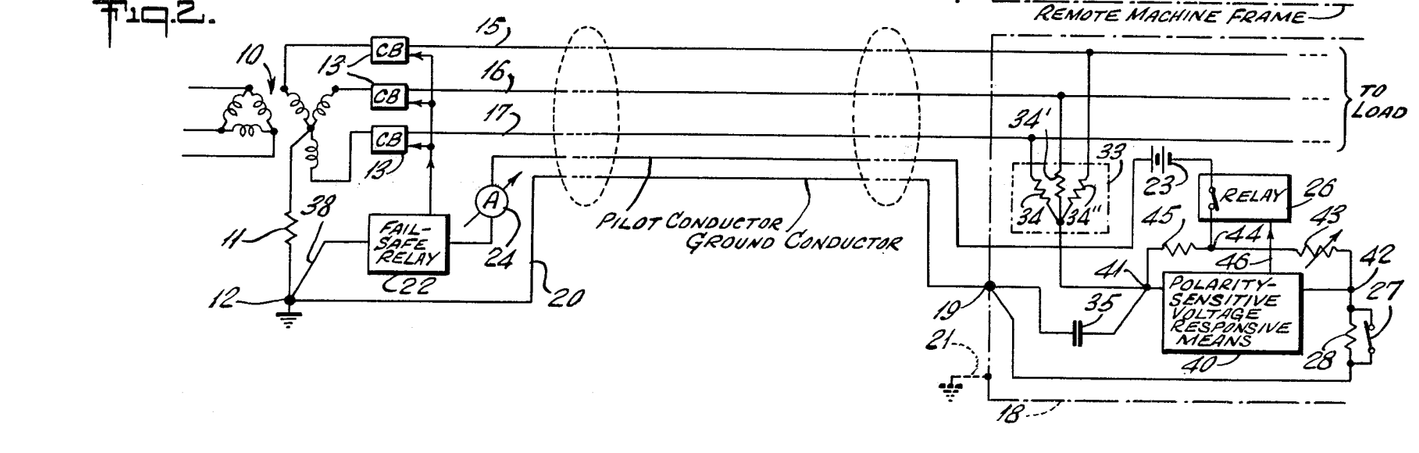
FIGS. 2 to 8 are simplified similar diagrams to show further embodiments.

The circuit arrangement of FIG. 2 bears certain resemblance to that of FIG. 1 and, therefore, corresponding reference numerals are used where appropriate. The principal difference resides in the technique for monitoring the ground conductor terminals 12–19 as to a predetermined resistance threshold.

In FIG. 2, polarity-sensitive voltage-responsive means 40 is employed to monitor voltage across opposed terminal corners 41–42 of a Wheatstone bridge, wherein the ground conductor 20 is connected at 42 to a variable resistor 43 to define one of two conjugate arms between opposed bridge-excitation terminal corners 44–12. The other conjugate arm between the excitation terminal corners 44–12 comprises the ground resistor 11 plus the effective resistance of network 33, all as connected at 41 to a further resistor 45. Voltage excitation for bridge terminals 44–12 may be developed from a d-c source 23 at the source-connection end of the pilot arm to terminal 44; however, in the preferred form shown, source 23 is at the load-connection end of the pilot arm. Thus, fail-safe relay 22 is normally "held-in" through flow of continuous current in the fail-safe circuit, from source 23 to terminal 44, resistor 43, testing contacts 27, terminal 19, and back via ground conductor 20 to the system ground 12 and its connection 38 to source 23.

Preferably, resistor 45 is selected for a resistance value which substantially matches the resistance between points 41–12, namely the combined effective resistance of network 33 and grounding resistor 11. Thus, if resistors 34–34'–34'' are in the order of 10 megohms and resistor 11 is negligible by comparison, the effective resistance between points 12 and 41 will be substantially 3.3 megohms, and resistor 45 is preferably selected at 3.3 megohms. The balanced condition of the bridge will therefore exist when the ground-conductor resistance (terminal 12 to terminal 19–42) equals the value set at resistor 43, and this value at 43 should be set to match the desired limiting resistance in the ground conductor 20 (e.g., 4 ohms to meet Bureau of Mines requirements, or preferably something less, such as 3 ohms, to exceed the Bureau of Mines requirement). Thus, in a normal operating situation wherein the actual ground-conductor resistance is in the order of 1 or 2 ohms, or is otherwise less than the limiting magnitude preselected at 43, the polarity-sensitive voltage-responsive means 40 will indicate or otherwise function in accordance with a first polarity status, for the d-c potential of terminal 42 with respect to terminal 41; however, should the ground-conductor resistance sufficiently increase (for example, through the resistance-degrading effect of having run bulldozer cleats over the trailing cable) to equal or exceed the resistance threshold preselected at 43, the bridge will pass through a balanced condition, with reversal of the polarity of the potential across terminals 41–42. The means 40 will be understood to produce a resulting output in line 46 to relay 26, causing an opening of the contacts of relay 26 upon such polarity reversal, and as previously indicated, such an opening in the pilot arm of the fail-safe circuit will produce drop-out of relay 22 and a trip of the breakers 13.

Also as previously described, and for a proper selection of test resistance at 28, a test opening of contacts 27 will create for means 40 the appearance of a "dangerous" resistance development in conductor 20, causing relays 26–22 to perform a power shutdown in the power conductors 14–15–16.

Figure 3:
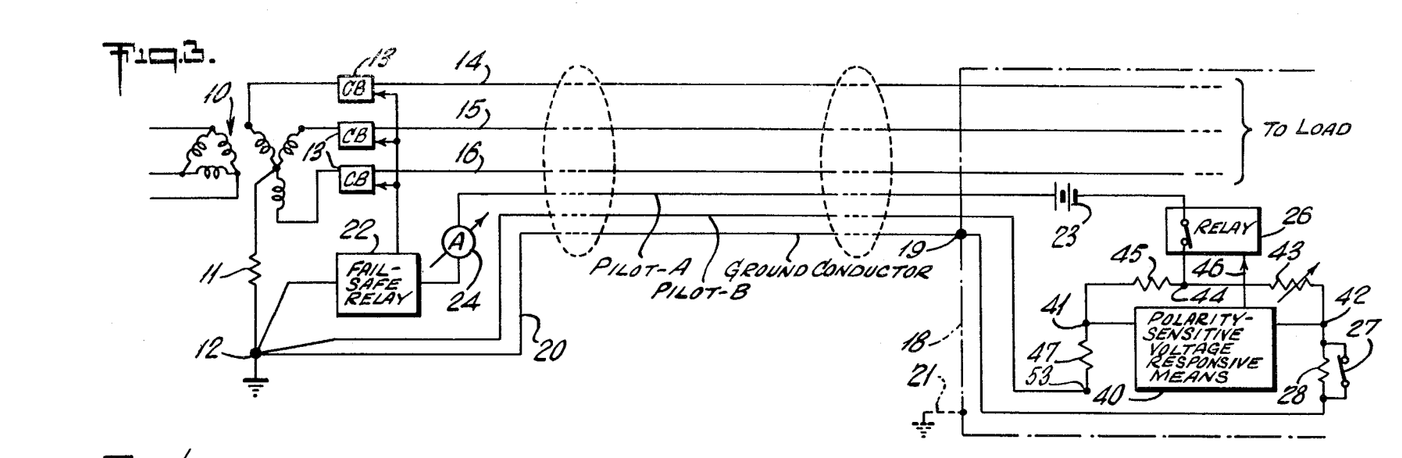

The embodiment of FIG. 3 illustrates another Wheatstone-bridge arrangement, wherein previously described corresponding parts are given the same reference numerals. The difference for the case of FIG. 3, is that the trailing cable has two pilot conductors, labeled Pilot A and Pilot B, respectively, and no use of the power conductors 14–15–16 is made for operation of the bridge.

In FIG. 3, the conjugate arm comprising ground conductor 20 and variable resistor 43 (interconnected at 42) may be as described for FIG. 2. However, the other conjugate arm comprises an additional resistor 47 and the Pilot-B conductor, connected at 41 to resistor 45. Bridge excitation from source 23 is applied to terminals 12–44, and resistors 45–47 are preferably selected to be substantially matched and of relatively large value, so that the fail-safe current will still circulate primarily by way of the ground conductor 20 and the Pilot-A arm, which includes relay 22, the normally closed contacts of relay 26, and the normally closed testing contacts 27. Operation is as described for FIG. 2.

Figure 4:
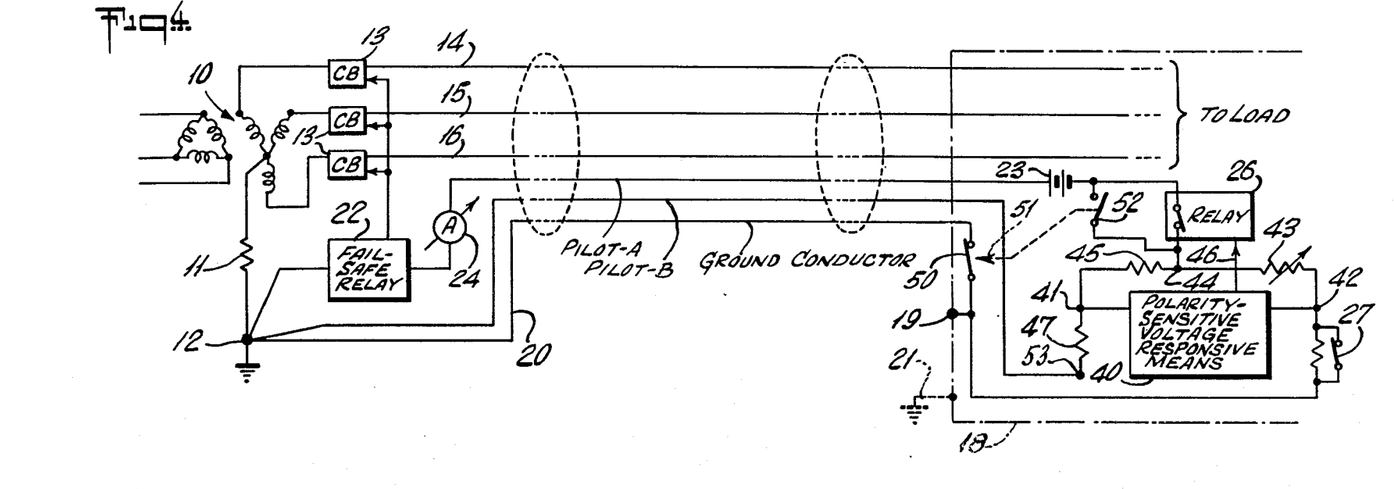

Although FIG. 4 is virtually identical to FIG. 3, it will be recognized as illustrating a principle that is applicable to all other disclosed forms of the invention.

In FIG. 4, the load-connection end of the ground conductor is brought to the local machine-ground terminal 19 by way of normally closed contacts 50, which may be push-button operated, as suggested at 51. Thus, a test procedure involving opening of contacts 50 will present the voltage-responsive means 40 with a resistance which represents the instantaneous true earth resistance (via 21) and all possible paths to the system ground 12; preferably, relay 26 is temporarily disabled during the measurement so as to avoid unwitting shutdown of power in conductors 14–15–16, and I provide normally open contacts 52 across the normally closed contacts of relay 26, contacts 52 being interlocked with contacts 50 (as suggested by dashed-line mechanical interconnection) to assure closure at 52 whenever contacts 50 are pressed open for an earth-ground resistance measurement. When contacts 50 are thus actuated, resistor 43 may be adjusted to achieve bridge balance (zero-indicated volts at 40), whereupon an indicating scale for the adjustment at 43 will be direct reading for the then-existing effective earth-ground resistance between the source-connection and load-connection ends of the system.

Figure 5:
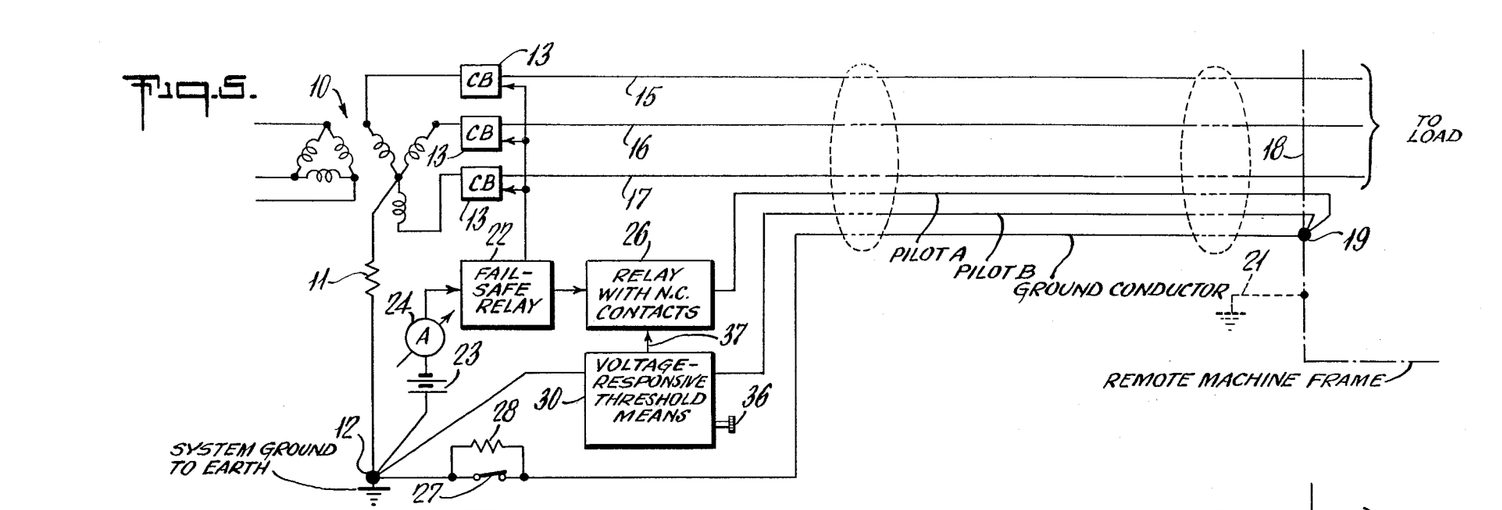
Figure 6:
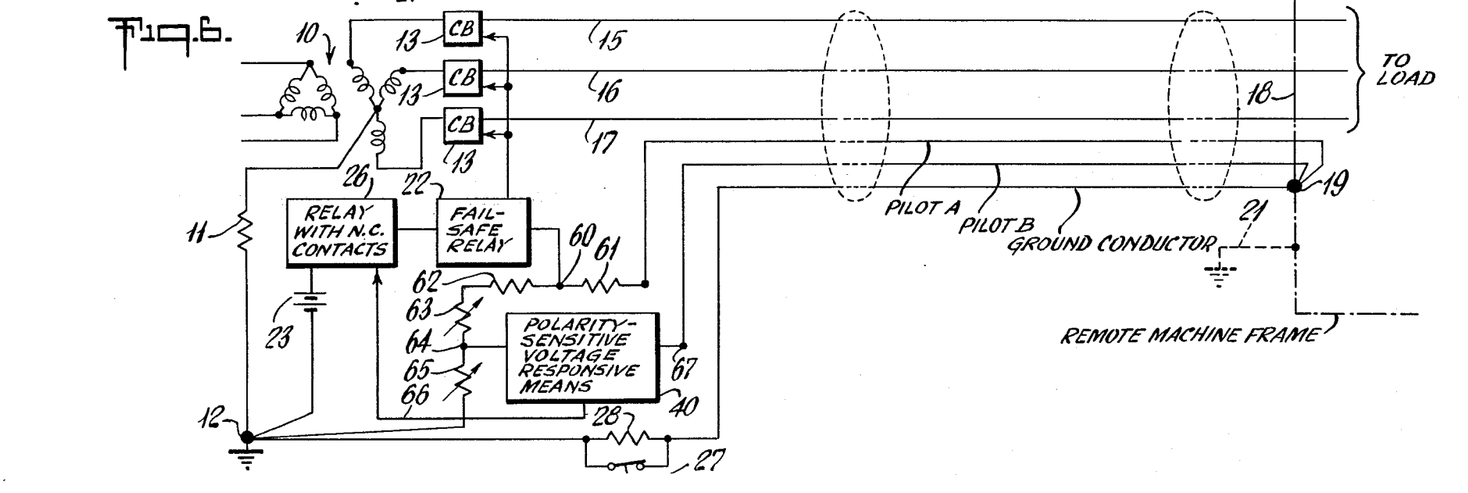

FIGS. 5 and 6 provide specific illustration of applications in which ground-conductor resistance is monitored from the source-connection end of trailing-cable systems, rather than from the load-connection end. The principles of these circuits are applicable to single pilot-wire cables, as in FIGS. 1 and 2 wherein power conductors serve a pilot-wire function, but the circuits of FIGS. 5 and 6 are shown in use with cable having two pilot wires (Pilot-A and Pilot-B) as in FIGS. 3 and 4.

Aside from the above-noted differences, the circuit of FIG. 5 will be recognized as being of the FIG. 1 principle, wherein ground-conductor current develops a voltage across the ground conductor, monitored by threshold means 30 across points 12–19 and using the Pilot-B conductor; at the load-connection end, both the Pilot-A and Pilot-B conductors are connected to the ground conductor at the point 19 of its connection to the remote machine frame. The circuit of the fail-safe relay utilizes the Pilot-A conductor and includes source 23, current-control means 24 and the normally closed contact function of relay 26, all at the source-connection end of the system. Means 24 is adjusted to a desired level of current flow (e.g., one ampere) in the circuit of the Pilot-A and ground conductors, it being noted that means 30 having to do with voltage measurement is of such relatively high resistance as to allow virtually no current flow in the Pilot-B conductor; voltage response at 30 is thus tantamount to response to instantaneous resistance in the ground conductor. As long as this observed resistance is less than the threshold level preset by means 36, and as long as current is able to flow in the fail-safe circuit, the fail-safe relay will stay energized, to maintain the closed condition of the line breakers 13. However, once the threshold is reached, an output in connection 37 to relay 26 is operative to break the pilot arm of the fail-safe circuit, thus dropping out relay 22 and the line breakers 13. System test, by manual opening of contact 27 at the system-ground end of the ground conductor, will momentarily inject sufficient resistance 28 into the ground conductor, to produce the same tripping of relay 22 and breakers 13, as will be understood.

The circuit of FIG. 6 represents illustration of the use of Wheatstone-bridge components at the source-connection end of the system wherein the bridge is severed to utilize the Pilot-B conductor in the voltage-response diagonal of the bridge rather than in the source-excitation diagonal of the bridge (as in FIG. 3). The source-excitation diagonal is between system ground and a bridge corner 60, the excitation circuit comprising source 23, the normally closed contacts of relay 26 and the fail-safe relay 22. From corner 60, the bridge divides into two matched high-resistance arms, namely, a first arm containing a relatively high resistance 61 (e.g., 1000 ohms) and the Pilot-A conductor to the remote-machine ground (frame) connection 19, and a second containing a relatively high resistance 62 (e.g., 1,000 ohms) and a variable resistor 63 to a bridge corner 64, resistor 63 being so adjusted as to enable close match of the combined value of resistors 62–63 to the combined value of resistor 61 and the Piot-A conductor. The voltage-measuring corners are at 19 and 64, the Pilot-B conductor being used to enable polarity-sensitive voltage-responsive means 40 to respond across this diagonal. One of the remaining arms is the ground conductor itself, between corners 19 and 12, and the final arm comprises a variable resistor 65 between corners 64 and 12, the value of resistance at 64 being set to the maximum resistance level to be tolerated in the ground conductor.

In normal operation, continuous current flow from source 23 divides substantially equally through the path 60–64–12 and through the path 60–19–12, the current being adequate to excite the fail-safe relay 22 and thus to hold the closed condition of line breakers 13. As long as means 40 detects no change in voltage polarity, the preset resistance value at 65 exceeds ground-conductor resistance, and the circuit permits safe delivery of power to the remote machine via power conductors 15–16–17. Any increase in ground-conductor resistance beyond the value preset at 64 causes sensed polarity to change at 40, causing a control output in line 66 to trip relay 26 and thus drop out relay 22 and the line breakers 13.

The described embodiments of the invention will be seen to have achieved all stated objects with structure of elemental simplicity and using non-critical components. In particular, the invention is realizable with minimum modification of existing trailing-cable installations in the field, and in all cases it is possible not only to monitor for the onset of a predetermined "unsafe" level of ground-conductor resistance, but also to test the monitoring efficiency as well as to actually measure the then-existing earth-ground resistance back to the system ground 12.

According to current Bureau of Mines requirements, a grounding resistor such as the resistor 11 for the supply-line neutral at the source-connection end must be of such ohmic value as to limit the voltage drop in the grounding circuit external to the resistor to no more than 100 volts under fault conditions and also to be such as to limit the ground fault current to no more than 25 amperes, thus establishing the above-noted 4-ohm limitation for ground-conductor resistance. It is believed that the present invention for the first time provides a means whereby this important ohmic value can be continuously monitored. And such monitoring is achieved while also meeting Bureau of Mines requirements as to operation of the fail-safe ground-check circuit, meaning that the breakers 13 will be tripped if either the pilot conductor or the ground conductor should open (i.e., break). Moreover, the nature and connection of the threshold responsive means (30, 40) are such as to be inherently relatively "blind" or insensitive to unbalanced load transients that may be induced in any part of the fail-safe circuit, so that the invention is operative where other systems cannot be relied upon, and using cable of virtually any sectional geometry, including asymmetrical cable sections.

The invention provides still further desirable features; in that:

a. The invention is operative with any length of cable, with only minor adjustment;
b. As long as the source 23 of fail-safe circuit current is at the remote end of the system, the breakers 13 will trip in the event of a short between pilot and ground conductors;
c. The invention does not require insulating the ground conductor or "lifting" it at any point;
d. The invention does not require use of a "shunt" or "shunts" in the ground or fail-safe circuit;
e. The invention will correctly respond to sense an open ground conductor, even though the cable or cables may be earth-grounded at several points;
f. The invention operates so to detect resistance and to assure shutdown of power that there will be no hazard in personnel contact with an unsuspected open ground;
g. The system is such as inherently not to require any resetting once it has tripped the circuit breakers, i.e., upon closing the circuit breakers, any subsequent trip action will be the result of a new threshold evaluation, to actuate relay 26;
h. The basic or modular-unit nature of the invention means that it is compatible with itself in any combination of major and subordinate trailing cables, breakers, couplings, Y or Δ winding configurations, etc.;
i. The invention does not require frequent resetting of threshold or critical adjustments, once installed; in fact, adjustments made in the shop, factory or otherwise prior to installation may in most cases be correct, without compromise of safety;
j. The bridge-connected threshold systems of FIGS. 2 to 4 are non-critical as to voltage or current in the fail-safe circuit, in that they all operate on a comparison between voltages at terminals 41–42, the excitation voltage being proportionally divided in like fashion along each of the respective conjugate arms of the bridge; and
k. Ground-conductor resistance may be so accurately monitored at a threshold level less than the lowest possible earth resistance that breaker trip through the invention provides a positive indication of trouble in the pilot conductor or in the ground conductor.

While the invention has been described in detail for the preferred forms shown, it will be understood that modifications may be made without departure from the scope of the invention. For example, the invention is not necessarily to be considered limited to three-phase power systems but is applicable wherever the necessary control of ground-conductor resistance is to be monitored, in systems which may be other than employed for power distribution, or in which other than three-phase power is delivered.

Also, for example, FIGS. 3 and 4 will be understood to schematically indicate elements of a separate article of manufacture for application to the remote end of an existing multiple-conductor cable system having a system ground 12 at the source-connection end. Such article may comprise the indicated interconnected components of virtually the entire Wheatstone bridge. Thus, such a package may contain the interconnected resistors 45–47–43 and voltage-responsive means 40, in which case the package presents three terminals for external connection in the field, there being included in such package a display of voltage detected by means 40 and a manual adjustment, preferably calibrated in ohms, for the variable resistor 43; the three terminals in such case are (1) a first bridge-excitation terminal, for field connection to the conductor arm (Pilot A) which serially contains the bridge-excitation voltage source, (2) the terminal 53 by which the serially connected fixed resistors 45–47 complete one of the conjugate bridge arms upon series-connection in the field to the adjacent end of an independent d-c conducting path to the other bridge-excitation terminal 12, and 3 the terminal 42 by which the variable resistor 43 is serially connected in the field to the load-connection end of the ground circuit to be evaluated by the bridge.

Still further by way of example, FIGS. 3 and 4 will be understood to schematically indicate elements of a further article of manufacture for field-testing of the fidelity of earth ground in a given system ground that is suspected of being less than adequately earth-bound. Such an article will be understood to comprise the elements of the package of the preceding paragraph, and to further include:

a. Elongate flexible conductors (Pilot A and Pilot B), connected to each other at one end 12, wherein the heavy dot at 12 will be understood to suggest means, such as an aligator clip, for removable connection to a system ground to be tested, one of these conductors (Pilot A) serially including a voltage source 23 and therefore comprising the means of excitation across bridge terminals 12–44, the other of these conductors (Pilot B) constituting with the resistors 45–47 a first conjugate arm of the bridge; and
b. Means symbolized at 19 or at 42 and comprising for example an aligator clip for removable connection of means 40–43 to another earth-bound system ground, such as a rail of railroad track, the cold-water supply plumbing of a building, etc., thereby completing the other conjugate-arm connections through resistor 43 and the two system grounds and the earth therebetween. In use of such an article, the adjustment at 43 to the point of bridge balance will provide a direct reading of true resistance between the two system grounds and if the ohmic reading is not as low as that to be expected for local earth resistance, it can be known that the suspected system ground is not to be trusted unless and until proper corrective measures have been taken.

Figure 7:
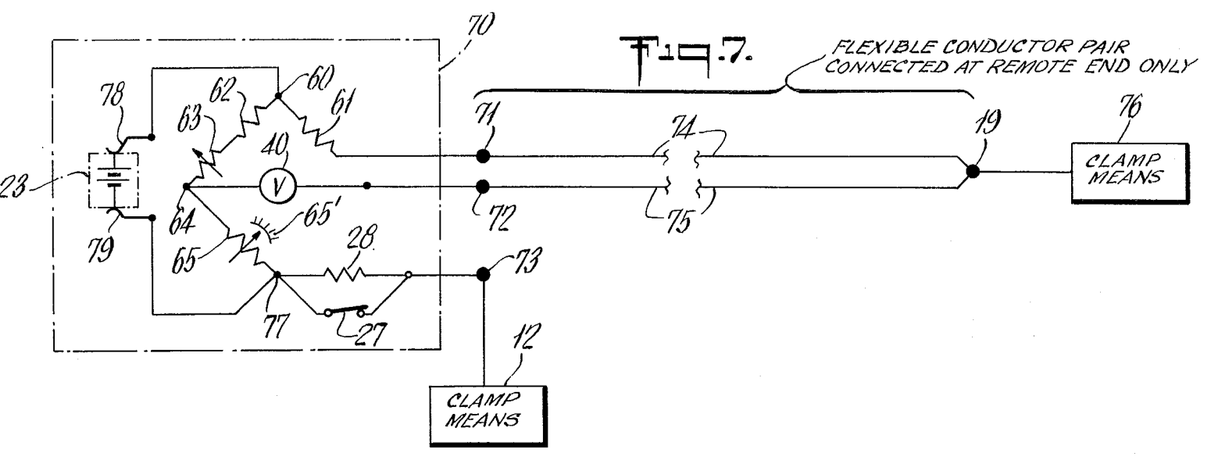
Figure 8:
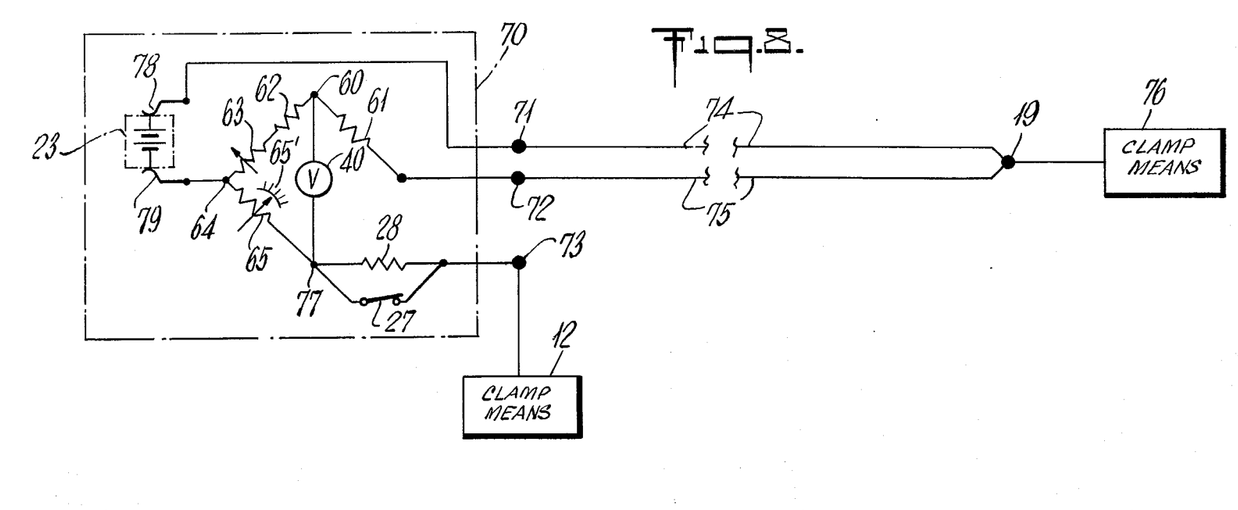

Analogy to the foregoing example of a field-testing article of manufacture (FIGS. 3 and 4) will be seen for the bridge-operated system illustrated in FIG. 6, the same being spedifically shown in the two embodiments of FIGS. 7 and 8. Such a FIG. 6 article of manufacture will be understood to comprise a package containing components of virtually the entire Wheatstone bridge. Thus, such a package may contain the interconnected resistors 61–62–63–65 and voltage-responsive means 40, in which case the package presents four terminals for external connection in the field, there being included in such package a display of voltage detected by means 40 and a manual adjustment, preferably calibrated in ohms, for the variable resistors 63–65; the four terminals in such case are (1) a first bridge-excitation terminal 67, for field connection to the conductor arm (Pilot B) which serially contains the voltage-responsive means 40, (2) the terminal 68 by which resistor 61 is connected to the Pilot-A conductor, (3, 4) the terminals 12–60 by which the system-ground and voltage-excitation connections are made. And to make such an article specific for field-testing the fidelity of earth ground, the package will be understood to additionally include:
 a. Means symbolized by the heavy dot 12 and comprising for example an aligator clip for removable connection of bridge arm 65 and source arm 23 to a first earth-bound system ground, such as a rail of railroad track, etc., thereby completing first conjugate-arm connections through resistors 62–63–65 to ground; and
 b. Elongate flexible conductors (Pilot A and Pilot B), connected to each other at one end (19), wherein the heavy dot at 19 will be understood to suggest means, such as an aligator clip, for removable connection to the system ground to be tested, one of these conductors (Pilot B) serially including voltage-responsive means and therefore comprising the means of measurement across the terminals 64–19, whereby the other of these conductors (Pilot A) may with resistor 61 complete the other conjugate arm of the bridge, through the two system grounds and the earth therebetween.

In the specific arrangement of FIG. 7, the ground-resistance measuring set 70 is seen to comprise three external-connection terminals 71–72–73. The terminals 71–72 serve two flexible conductors 74–75 which are of length appropriate to the distance over which the earth-ground resistance measurement is to be made; conductors 74–75 are interconnected at their remote end, symbolized by the heavy dot 19 where clamp means 76, such as an aligator clip, is used for selective removable connection to an "unknown" earth-ground connection. At the set 70, a similar clamp means is connected to terminal 73 for base-end connection to a "known" earth-ground connection, the same being identified 12, for electrical consistency with previous discussion.

Within set 70, the bridge elements 61–62–63–65 will be recognized from FIG. 6, the excitation corners 60–77 being served by the d-c source 23; as shown, source 23 is a battery removably connected by spring clips 78–79. The test resistor 28 and its bridging switch 27 are shown between corner 77 and terminal 73.

Viewed electrically, the two high-resistance conjugate arms of the bridge comprise resistors 62–63 (between corners 60–64), and resistor 61 plus the resistance of flexible conductor 74 (between corners 60–19), it being understood that resistors 61–62 are of very much greater resistance than that of conductor 74, with variable resistor 63 serving to trim or initially calibrate the match of these high-resistance arms. The voltage-responsive means 40 is of such high internal impedance as to draw preferably zero current; its connection across the other bridge diagonal (64–19) upon the second flexible conductor 75. Finally, the variable resistor 65 in the third arm is selected to cover the range of relatively low resistances which is expected to occur in the measurement of earth resistance.

In use of the device of FIG. 7, and upon establishing base and remote ground connections at clamp means 12 and 76, resistor 65 is varied until zero volts at 40 indicates bridge balance. If resistor 65 is calibrated in ohms, as suggested at 65', the earth-resistance reading is directly observable. Clamp 76 may then be released, as for portability to a new location, for another earth-ground measurement.

The arrangement of FIG. 8 will be recognized for its similarity to FIG. 7, the only difference being that voltage excitation is applied to the bridge corners 64–19, while voltage-response by means 40 is between the remaining bridge corners 60–77. The high-resistance arms 62–63 and 61–74 are as previously described, and resistor 65 is again relied upon for establishing bridge balance (0 volts indicated at 40).

What is claimed is:

1. As an article of manufacture, a unitary ground-resistance measuring set adapted for use with a local earth-ground connection at one end of an elongate electrical multiple-conductor cable the other end of which includes at least two conductor connections to a remote ground to earth; said set comprising resistance-bridge elements consisting of elements of two conjugate arms for connection between opposed first diagonal bridge terminals, one of which terminals is said remote ground and the other of which is contained in said set; a monitoring variable resistor connected at one end to the first diagonal bridge terminal of said set and having means at its other end for connection to said local earth-ground connection, whereby said monitoring resistor may be connected in series with the earth between cable ends to define one of the conjugate arms, and whereby the local earth-ground connection may be one terminal of the second diagonal of the bridge; two series-interconnected resistance members forming elements of the other conjugate arm and connected at one end to the first diagonal bridge terminal of said set and having means at its other end for connection to one of the remote-grounding conductors of said cable, the point of interconnection of said resistance members of said other conjugate arm defining the other terminal of the second diagonal of the bridge; d-c source supporting means at said set and having first and second pole connections to the terminals of one bridge diagonal; and voltage-responsive means at said set and interconnecting the terminals of the second bridge diagonal; the diagonal connection to said remote-ground terminal being via the other remote-grounding conductor of said cable.

2. The article according to claim 1, wherein the said resistance members in said other conjugate arm are each of substantially greater ohmic value than said variable resistor.

3. As an article of manufacture, a ground-resistance bridge measuring set comprising two elongate flexible conductors connected to each other only at the end remote from said set and having connectable means at said one end for detachable connection to a first earth-bound ground, said bridge set including first bridge-diagonal arm elements with means for series-accommodation of a voltage source and second bridge-diagonal arm elements with means for series-accommodation of a voltage-responsive device, said first earth-bound ground being a first corner of said bridge, resistance-bridge elements consisting of elements of two conjugate arms connected to said first corner and across one of said bridge diagonals, two series-interconnected resistance members forming elements of one conjugate arm and defining at their interconnection one terminal of the other bridge diagonal, means including second earth-bound ground-connectable means local to the set and including a further resistor member in the set for establishing said further resistor member and the earth-ground resistance as the other conjugate arm, said second earth-bound ground-connectable means defining the other terminal of the other bridge diagonal, the bridge diagonal to said first earth-bound ground being via one of said conductors and that part of said first conjugate arm which is to be connected to the first earth-bound ground being via the other of said conductors, one of the resistor members of said bridge being variable, whereby upon bridge balance the adjustment of the variable resistor member is indicative of earth resistance between said earth-bound system grounds, plus resistance indicative of the degree of fidelity of connection of said grounds to earth.

4. The method of using Wheatstone-bridge elements at one end of an elongate multiple-conductor cable to check the instantaneous true-resistance status end-to-end of a conductive path via earth ground between the ends of said cable, which comprises interconnecting two of said conductors to each other and to a first earth-ground connection of said path at the other end of said cable to define one of two bridge-excitation terminals; serially connecting a voltage source in one of said two conductors to thereby define the other of said bridge-excitation terminals at the one end of said one conductor; forming two conjugate arms extending between said opposed bridge-excitation terminals by (1) selecting and serially interconnecting two resistors of relatively high ohmic value and serially connecting the same with the other of said conductors at said one end, thereby defining one of said arms, and (2) selecting a variable resistor of relatively low ohmic value and serially interconnecting the same with a second earth-ground connection of said path at said one end; and varying said resistance until substantially zero voltage is observed between the point of interconnection of said fixed resistors and the point of interconnection of said variable resistor with said earth-ground path.

5. The method of using Wheatstone-bridge elements at one end of an elongate multiple-conductor cable to check the instantaneous true-resistance status end-to-end of a conductive path via earth ground between the ends of said cable, which comprises interconnecting two of said conductors to each other and to a first earth-ground connection of said path at the other end of said cable to define one of two bridge-excitation terminals; serially connecting a voltage source in one of said two conductors to thereby define the other of said bridge-excitation terminals at the one end of said one conductor; forming two conjugate arms extending between said opposed bridge-excitation terminals by (1) selecting and serially interconnecting two resistors of relatively high ohmic value and serially connecting the same with the other of said conductors at said one end, thereby defining one of said arms, and (2) selecting a variable resistor of relatively low ohmic value and serially interconnecting the same with a second earth-ground connection of said path at said one end; setting the resistance of said variable resistor to an ohmic value which is predetermined to represent a threshold of tolerable resistance above a normal resistance in said earth-ground path, and observing for reduction to substantially zero the voltage between the point of interconnection of said fixed resistors and the point of interconnection of said variable resistor with said earth-ground path.

6. The method of using Wheatstone-bridge elements at one end of an elongate multiple-conductor cable to check the instantaneous true-resistance status end-to-end of a conductive path via earth ground between the ends of said cable, which comprises interconnecting two of said conductors to each other and to a first earth-ground connection of said path at the other end of said cable to define one of two bridge-excitation terminals; serially connecting a voltage source in one of said two conductors to thereby define the other of said bridge-excitation terminals at the one end of said one conductor; forming two conjugate arms extending between said opposed bridge-excitation terminals by (1) selecting and serially interconnecting two resistors of relatively high ohmic value and serially connecting the same with the other of said conductors at said one end, thereby defining one of said arms, and (2) selecting a variable resistor of relatively low ohmic value and serially interconnecting the same with a second earth-ground connection of said path at said one end; setting the resistance of said variable resistor to an ohmic value which is predetermined to represent a threshold of tolerable resistance above a normal resistance in said earth-ground path, and observing for change in polarity the voltage between the point of interconnection of said fixed resistors and the point of interconnection of said variable resistor with said path.

7. The method of using Wheatstone-bridge elements at one end of an elongate multiple-conductor cable to check the instantaneous true-resistance status end-to-end of a conductive path via earth ground between the ends of said cable, which comprises interconnecting two of said conductors to each other and to a first earth-ground connection of said path at the other end of said cable to define one corner of the bridge; selecting and serially connecting two resistances of ohmic value much higher than that of the path to be checked, thereby defining a second bridge corner at the interconnection of said resistances; selecting and connecting in series with the free end of one of said high resistances a low resistance of ohmic magnitude comparable to that for which observation is to be made in said path, thereby defining a third bridge corner at said interconnection of high and low resistances, and thereby also leaving an available free end of a high resistance and an available free end of the low resistance; connecting one of said available free ends to said one end of a first cable conductor; and connecting the other available free end to a second earth-ground connection of said one end of said path, thereby defining the fourth bridge corner, and thereby establishing the series loop-connection of all four bridge corners wherein said earth-ground path is the arm between said first and fourth corners; selecting and diagonally connecting a voltage-excitation source between a first two opposite bridge corners; and selecting and diagonally connecting a voltage-responsive device between the remaining two opposite bridge corners; locating the voltage-excitation source and the voltage-responsive device at said one end of the cable, and using a second cable conductor to complete the requisite one of the diagonal connections to said first-defined bridge corner.

8. As an article of manufacture, a unitary ground-resistance measuring set adapted for use with a local earth-ground conductor at one end of an elongate electrical multiple-conductor cable the remote end of which includes an earth-ground connection of at least a pair of conductors of said cable; said set comprising Wheatstone-bridge elements, d-c source supporting and connecting means, and voltage-responsive means; said set further comprising ground-connection means for making an earth-ground connection local to said set, and first and second terminals for connection at said one end to the respective two cable conductors which are remotely earth-grounded, whereby the point of remote earth-grounding may constitute a first bridge corner and the earth path between remote and local earth grounds may be one of the arms of a completed bridge; said bridge elements at said set comprising two serially connected resistance arms of ohmic value much higher than that of the earth-ground path to be measured, thereby defining a second bridge corner at the interconnection of said high-resistance arms, a low-resistance arm of ohmic value comparable to that of the earth-ground path to be measured, said low-resistance arm being connected to the otherwise-free end of one of the high-resistance arms, thereby defining a third bridge corner at interconnection of high and low-resistance arms, and thereby also defining first and second otherwise-available free ends of a high-resistance arm and of the low-resistance arm respectively, said otherwise-available free ends being respectively connected to said first terminal and to the ground-connection means of said set, thereby defining the fourth bridge corner at the ground-connection means of said set, and thereby establishing the series-loop connection of all four bridge corners via said arms when said set is cable-connected as aforesaid; said d-c source connecting means comprising opposite-pole connections for a first two diagonally opposite bridge corners, and voltage-responsive means for diagonally connecting the remaining two opposite bridge corners, the one of said diagonal connections which is to include the first-defined bridge corner being connected to the second of said terminals, so that the second remotely-grounded cable conductor may be the means of completing the diagonal connection to the first-defined bridge corner.

9. The article of claim 8, in which said low-resistance arm is selectively variable, whereby measured earth-path resistance is a function of the adjusted ohmic value of the low-resistance arm at bridge balance.

10. As an article of manufacture, a Wheatstone-bridge ground-resistance measuring set comprising a pair of elongate flexible conductors connected to each other at one end only and having means at said one end for detachable connection to a first earth-bound ground, thereby defining at said detachable connection a first bridge corner; said set further comprising d-c source-supporting and connecting means, voltage-responsive means, and second-ground means for detachable connection to a second earth-bound ground; thereby defining, electrically adjacent to said first bridge corner, a second bridge corner at said second-ground means and establishing an earth-resistance bridge arm between said corners; said bridge elements of said set comprising two serially connected resistance arms of ohmic value much higher than that of the earth-ground path to be measured, thereby defining a third bridge corner at the interconnection of said high-resistance arms, a low-resistance arm of ohmic value comparable to that of the earth-ground path to be measured, said low-resistance arm being connected to the otherwise-free end of one of the high-resistance arms, thereby defining a fourth bridge corner at interconnection of high and low-resistance arms, and thereby also defining first and second otherwise-available free ends of a high-resistance arm and of the low-resistance arm respectively, said otherwise-available free ends being respectively connected to the other end of one flexible conductor and to said second bridge corner respectively, thereby establishing the series-loop connection of all four bridge corners via said arms when said set is detachably ground-connected as aforesaid; said d-c source-connecting means comprising opposite-pole connections to a first two diagonally opposite bridge corners, and voltage-responsive means for diagonally connecting the remaining two opposite bridge corners, the one of said diagonal connections which is to include the first-defined bridge corner being connected to the other end of the other flexible conductor, whereby said other flexible conductor is the means of completing the diagonal connection to the first-defined bridge corner.

* * * * *